Patented Dec. 9, 1924.

1,518,742

UNITED STATES PATENT OFFICE.

LÉON LAMY, OF ST.-JEOIRE EN FAUCIGNY, FRANCE.

PROCESS FOR EXTRACTING TIN FROM TIN-CONTAINING MINERALS, ALLOYS, SCORIA, AND SCRAP.

No Drawing.   Application filed June 24, 1924.   Serial No. 722,055.

*To all whom it may concern:*

Be it known that LEON LAMY, residing at Usines du Giffre, at St.-Jeoire en Faucigny, Haute Savoie, France, has invented an Improved Process for Extracting Tin from Tin-Containing Minerals, Alloys, Scoria, and Scrap, of which the following is a specification.

It is known that tin containing minerals, alloys, scoria and scrap nearly all contain iron which is separated from the tin by reduction for the purpose of obtaining the tin in a pure state.

It is difficult to reduce complex tin minerals to obtain crude refined tin; there is obtained during a treatment of this type a whole series of intermediate products from which it is difficult to obtain all the tin in the form of commercial tin.

By this invention the successive stages of exhaustion of the mineral, which cause great cost and losses of metal, are eliminated and the reducing operations are simplified while the pure tin is separated as a whole from the iron.

The process which forms the subject of this invention and which will be hereinafter described is moreover not only applicable to the treatment of tin minerals but also to tin containing scoria, scraps, scum, hards and eliquation products and generally to all iron-tin alloys.

According to this invention there is introduced at any period of the reducing operations for the minerals or the like or of the refining of alloys, a substance such as silicon, ferrosilicon or other metal, metalloid or alloy, which has the property of forming with iron an alloy or definite compound or solid solution which is cleanly separable from the tin but forms no alloy or other combination with the tin. The iron in the mineral or alloy will thus remain, after treatment, alloyed with such added substance while the tin will separate in a form practically free from iron. The added substance may as above stated be introduced, molten or cold at any phase during the operation of reducing the mineral or the like or of refining the alloy; or it may be produced in the furnace itself when treating a stanniferous product.

The iron alloy or compound obtained (which when hot is soluble in the tin) may be separated from the tin on cooling owing to its difference of density with respect to the tin.

As an example, either the melted crude ferrous metal obtained by complete reduction of a tin mineral or hards resulting from the treatment of eliquation scums or products is run into a pocket and there treated or a charge of cold pigs of the metal is placed in a fusion furnace containing molten silicon, ferro-silicon or other metal, metalloid or alloy forming the added substance. The metallic mass is heated until completely fused and then stirred to obtain as intimate a mixture as possible of the materials. When solution is complete, it is run into a pocket or ingot mould in which both the tin and the iron alloy completely separates on cooling owing to their different densities.

Or again, a furnace may be charged with ferro-silicon on a fusion bed composed of ordinary of stanniferous quartz, a suitable reducing agent and a crushed ferrotin alloy which acts in a manner similar to the iron scrap or turnings in the current manufacture of ferro-silicon. When reduction is complete the metal obtained is run into ingot moulds or into a pocket, the separation both of the tin and the silicon-iron alloy taking place as before.

What I claim is:—

The method of extracting tin from materials containing tin and iron, comprising the steps of treating such materials in a molten condition with a substance having the properties of elemental silicon to form a ferro-silicon; and separating said tin and said ferro-silicon.

In testimony whereof I have affixed my signature.

LEON LAMY.